(12) United States Patent
Serna Garcia-Conde et al.

(10) Patent No.: US 12,091,140 B2
(45) Date of Patent: Sep. 17, 2024

(54) METHOD FOR THE MAINTENANCE OF WIND TURBINE TOWERS BY MEANS OF AUXILIARY FLOATING SYSTEMS

(71) Applicant: ESTEYCO S.A., Madrid (ES)

(72) Inventors: Jose Salustiano Serna Garcia-Conde, Madrid (ES); Carlos Garcia Acon, Madrid (ES)

(73) Assignee: ESTEYCO S.A., Madrid (ES)

( * ) Notice: Subject to any disclaimer, the term of this patent is extended or adjusted under 35 U.S.C. 154(b) by 381 days.

(21) Appl. No.: 17/613,714

(22) PCT Filed: Jun. 1, 2020

(86) PCT No.: PCT/ES2020/070356
§ 371 (c)(1),
(2) Date: Nov. 23, 2021

(87) PCT Pub. No.: WO2020/240068
PCT Pub. Date: Dec. 3, 2020

(65) Prior Publication Data
US 2022/0227465 A1  Jul. 21, 2022

(30) Foreign Application Priority Data

May 31, 2019 (ES) .............................. ES201930489

(51) Int. Cl.
*B63B 35/44* (2006.01)
*B63B 22/20* (2006.01)
(Continued)

(52) U.S. Cl.
CPC .............. *B63B 35/44* (2013.01); *F03D 13/25* (2016.05); *F03D 80/50* (2016.05); *B63B 22/20* (2013.01);
(Continued)

(58) Field of Classification Search
CPC ......... B63B 35/44; B63B 22/20; F03D 13/25; F03D 80/50; F05B 2230/61; F05B 2230/80; F05B 2240/95
See application file for complete search history.

(56) References Cited

U.S. PATENT DOCUMENTS

2009/0217852 A1  9/2009  Zaman et al.
2013/0152840 A1  6/2013  Awashima et al.

FOREIGN PATENT DOCUMENTS

CN      102730552 A    10/2012
EP        2327874 A2     6/2011
(Continued)

*Primary Examiner* — Stephen P Avila
(74) *Attorney, Agent, or Firm* — Hayes Soloway P.C.

(57) ABSTRACT

Methods for the maintenance of a marine structure having a wind turbine and at least one essentially vertical shaft are described. The methods include the use of an auxiliary floating system having: at least one floating element that remains semisubmerged throughout the process of maintaining the marine structure; at least one coupling structure that connects the system to the floating structure; and contact elements and tightening elements, wherein the contact and tightening elements are secured to the coupling structure and are intended to solidly connect the system to the shaft. Advantageously, this solid connection allows operations for the maintenance of the marine structure to be carried out in a manner that is efficient and safe for maintenance workers and for the systems involved in the operations.

23 Claims, 8 Drawing Sheets

(51) Int. Cl.
*F03D 13/25* (2016.01)
*F03D 80/50* (2016.01)

(52) U.S. Cl.
CPC ....... *F05B 2230/61* (2013.01); *F05B 2230/80* (2013.01); *F05B 2240/95* (2013.01)

(56) References Cited

FOREIGN PATENT DOCUMENTS

| | | | | |
|---|---|---|---|---|
| EP | 2905217 A1 | 8/2015 | | |
| ES | 2642177 A1 | 11/2017 | | |
| WO | WO-2006053254 A2 * | 5/2006 | ........... | E02B 17/027 |

* cited by examiner

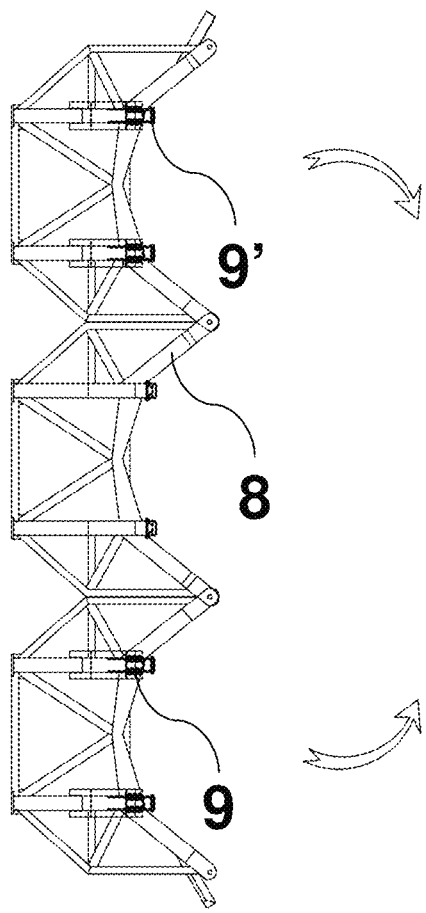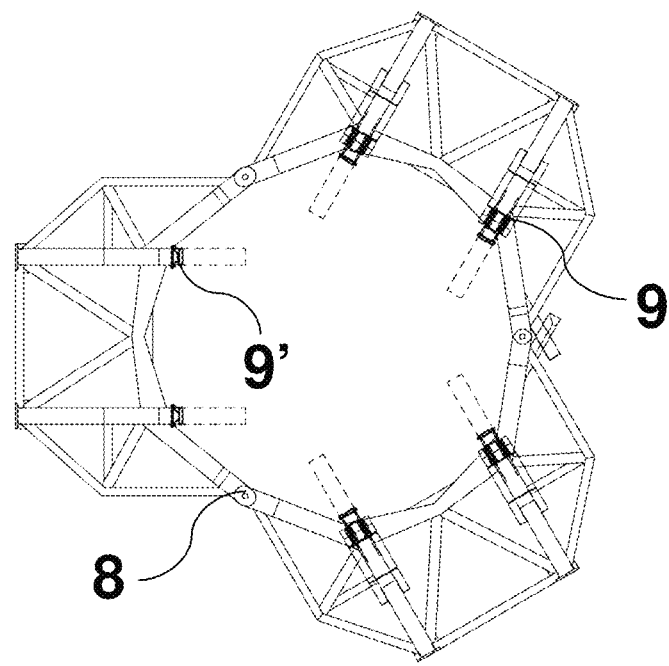
FIG. 3a                    FIG. 3b

METHOD FOR THE MAINTENANCE OF WIND TURBINE TOWERS BY MEANS OF AUXILIARY FLOATING SYSTEMS

CROSS-REFERENCE TO RELATED APPLICATIONS AND PRIORITY

This patent application claims priority from PCT Patent Application No. PCT/ES2020/070356 filed Jun. 1, 2020, which claims priority from Spanish Patent Application No. P201930489 filed May 31, 2019. Each of these patent applications are herein incorporated by reference in their entirety.

FIELD OF THE INVENTION

The present invention relates primarily to a method of using auxiliary floating systems for the maintenance of marine towers, for example for the maintenance of offshore wind turbine towers. The main sector of application of the invention is, therefore, the civil construction industry and, particularly, the tower and/or foundation construction and maintenance industry, in combination with the green or renewable, more specifically the marine wind energy, industry.

BACKGROUND OF THE INVENTION

In the marine wind energy sector, wind turbine maintenance tasks, commonly known as "large corrective" maintenance, have an enormous economic repercussion and importance, which require a crane for lifting or lower heavy components of the wind turbine located at a great height, around 100 meters or more.

For now, said "large corrective" operations for marine wind turbines have been performed almost exclusively by means of jack-up vessels, which are boats equipped with legs that can be supported on the sea floor, for lifting the hull of the vessel. Therefore, the crane incorporated by the actual vessel can work and is barely affected by the movement of the sea. However, these vessels are very scarce and costly and as a result they greatly penalize the maintenance costs of marine wind farms.

A much more cost-effective solution known in the art for operating cranes in marine constructions is the solution based on the use of conventional land cranes on barges or pontoons. However, this option is not feasible in the case of marine wind turbines. Since the working height is very high, movements of the barge supporting the crane multiply at the end of the boom which must operate at a certain level of the wind turbine, which makes the operation of the crane impracticable, even in very favorable conditions with respect to the state of the sea. The aforementioned problems become even greater when the support structure of the wind turbine is not secured, but rather floating.

The present invention is intended for overcoming these limitations and drawbacks of known systems during operations for the maintenance of marine structures, by means of a novel auxiliary floating system and the corresponding method of use thereof, which make it possible to cancel out relative movements between the floating element supporting the maintenance crane and the marine structure supporting the wind turbine on which maintenance is to be performed.

BRIEF DESCRIPTION OF THE INVENTION

To overcome the drawbacks of the state of the art described above, the object of the present invention is to provide a method of use of an auxiliary floating system for the maintenance of marine structures, such as wind turbine towers, said marine structures being floating or not floating, and wherein said system allows the mentioned maintenance operations to be optimized with respect to known systems. Said object is preferably performed by means of a method for the maintenance of a wind turbine supported on a marine structure, which can be floating or secured on the seabed, and comprising a shaft and/or a foundation. The invention is particularly suitable in operations for the maintenance of components at a great height, preferably by means of crane operations. The invention further allows the limitations of known barge or floating crane systems to be overcome in operations in which the freedom of movement of said systems is a drawback or even unadvisable, for example in the case of operations for the maintenance of wind turbines.

Advantageously, the method of the invention comprises the use of an auxiliary floating system comprising:

One or more floating elements.

At least one crane located on at least one of said floating elements.

At least one work area for the storage and/or repair of components of the wind turbine and/or the marine structure.

At least one coupling structure for coupling to the marine structure, wherein said coupling structure in turn comprises:

an articulated closure ring, suitable for being closed surrounding an element of the marine structure, preferably the shaft or tower, although it can also be closed on other elements of the foundation, without departing from the scope of the invention.

A plurality of contact elements between the coupling structure and the marine structure. In a preferred embodiment, at least three contact elements are arranged at a higher level and at least three other contact elements are arranged at a lower level, such that a torque is generated between the reaction of the elements of the upper level and the reaction of the elements of the lower level, and the transmission of moments between the coupling structure and the element of the marine structure to which it is coupled is thereby facilitated.

One or more tightening elements which allow the position of the contact elements to be regulated, said tightening elements being suitable for exerting a tightening force, through the contact elements, on the marine structure.

Preferably, the coupling structure for coupling to the marine structure can adopt at least three configurations:

An open configuration, in which the closure ring is open.

A closed configuration, in which the closure ring is closed.

A tightened configuration, in which the closure ring is closed, and the tightening elements are arranged exerting a tightening force on the marine structure.

Additionally, the method of the invention comprises performing the following steps, in any order that is technically possible:

a) Transporting the auxiliary floating system afloat to the location of the marine structure.

b) Approximating the auxiliary floating system to the marine structure, with the coupling structure in the open configuration.

c) Arranging the coupling structure in the closed configuration, such that the closure ring completely surrounds an element of the marine structure.

d) Acting in a controlled manner on the tightening elements, so as to arrange the coupling structure in the tightened configuration, such that the marine structure and the auxiliary floating system come to be solidly connected in the six degrees of freedom of movement (heave, surge, sway, yaw, pitch, and roll).
e) Using the crane to perform maintenance tasks on the wind turbine and/or on the marine structure.
f) Using the work area of the auxiliary floating system for storing and/or repairing components of the wind turbine and/or of the marine structure.
g) Uncoupling the auxiliary floating system from the marine structure, arranging the coupling structure in the open configuration.

In a preferred embodiment of the method of the invention, the auxiliary floating system comprises a plurality of floating elements, connected to one another and/or to the coupling structure.

In another preferred embodiment of the method of the invention, the auxiliary floating system comprises a single floating element in the form of a barge, in which both the crane and the work area is arranged, and wherein said barge is formed by a single body or by the attachment of several modules that are connected to one another. In this second case, the barge can be formed by an ad-hoc module, specifically designed such that it comprises the coupling structure, and to which conventional or commercial barge modules are coupled, to complete a barge with the required area. Cost economy is thereby achieved as the number of specific elements for the system is minimized, and the complementary use of standard modules for barges known in the art is allowed.

In another preferred embodiment of the method of the invention, the crane is a telescopic and/or folding crane, and said crane is deployed after step d) and folded up again before step g). This possibility is advantageous because it facilitates and/or increases the stability of the floating system when it is afloat and untethered (i.e., not coupled to the marine structure).

In another preferred embodiment of the method of the invention, the work area is located at least in part at a distance from the crane that is greater than the minimum radius of action of said crane. The radius of action of the crane imposes limits not only in the case of being too far away, but also if it is too close (this second case is the most limiting case as in certain configurations, the cranes cannot work with elements that are too close to said cranes), and this ends up imposing minimum dimensions on the barge. To prevent this from leading to very large barges, the movements of which are harder to avoid, the invention considers the use of a "free" work area, with a configuration similar to the configuration that a helipad, for example, can have on vessels or offshore structures, which can be moved away from the crane without increasing the size of the barge and of its waterplane area as a result. Said work area is at least in part free with respect to the floating elements, such that at least part of the area of the work area is not located on the deck of a floating element. The advantage of a free platform lies in the fact that by means of its use, it is possible to move the work area of the crane away so that it is outside of its minimum work radius, without unnecessarily increasing the area of the floating element as a result. Limiting the area in turn allows the stresses on the entire system and the marine structure itself during the coupling between both to be limited.

In another preferred embodiment of the method of the invention, steps a) and/or b) are performed by means of towing the auxiliary floating system, which allows costs of the auxiliary system to be reduced. However, the auxiliary floating system according to the present invention can also be self-propelled, not requiring in that case the use of tugboats for the operation thereof.

In another preferred embodiment of the method of the invention, the floating elements comprise hydrodynamic damping plates. The advantage of said plates is, mainly, their capacity to limit the movements afloat, in particular during coupling and uncoupling steps b), c), and g).

In another preferred embodiment of the method of the invention, the floating elements can be ballasted in a central or eccentric manner. The advantage of an eccentric ballasting consists essentially of offsetting the weight of the crane in the preferred case in which the crane is arranged in an eccentric manner, which facilitates preventing interferences with the coupling structure and allows to suitably move the work area of the crane away so as to leave it outside of the minimum work radius of the crane. The eccentric ballast system also allows the presence of other eccentric weights, such as that of the coupling structure, to be offset.

In another preferred embodiment of the method of the invention, said method comprises, after step d), step:
j) ballasting at least one floating element to offset a rise in tide and/or unballasting at least one floating element to offset a lowering of the tide. The force that has to be transmitted through the coupling structure to maintain the solid coupling thereof with the marine structure during heave is thereby reduced. This advantage only applies to the case of secured marine structures, not to the case of floating structures, because if the marine structure on which maintenance is to be performed is floating, the tide equally affects the marine structure and the auxiliary floating system. Alternatively, the coupling structure can be kept in the tightened configuration and solidly connected during heave only while the crane is operating in step e). In contrast, when the crane is not operating, the coupling structure can loosen the tightening force to free the movement during heave, such that a relative movement between the auxiliary floating system and the marine structure is allowed during heave so as to adapt to variations of the tide.

In another preferred embodiment of the method of the invention, the freeboard of the auxiliary floating system is compatible with the tidal range such that, while the auxiliary floating system remains coupled to a secured marine structure, the variation of the tide never reduces the freeboard to less than 10 cm.

In another preferred embodiment of the method of the invention, the auxiliary floating system is equipped with one or more approximation or securing cables between said system and the marine structure, and wherein the length of said cables is regulated during approximation step b). These cables will usually be operated by means of winches, and this has the advantage of allowing greater control during the operation for approximating the auxiliary floating system to the marine structure. In a preferred embodiment, the cables are fixed to the marine structure at one end, and their length is regulated by means of winches from the auxiliary floating system. The cables can also, for example, partially surround the shaft of the marine structure and have both ends secured in the auxiliary floating system.

In another preferred embodiment of the method of the invention, the closure ring holds an inner space sufficient for the coupling thereof to a region of the marine structure comprising a boat landing structure. Interferences with said boat landing during the operations for coupling or uncoupling the system to/from the marine structure are thereby prevented from occurring.

In another preferred embodiment of the method of the invention, the tightening elements comprise:

A lever secured at an articulation point with respect to which it can rotate.

A contact element connected to a point of said lever.

An extendable and/or folding hydraulic cylinder connected to another point of said lever. and wherein by actuating the hydraulic cylinder to extend and/or fold it, said lever is caused to rotate, and the position and/or force exerted by said contact element is thereby regulated.

In another preferred embodiment of the method of the invention, the distance between the line of action of the hydraulic cylinder and the articulation point is greater than the distance between the line of action of the contact element and the articulation point, such that by the lever effect, a force F in the hydraulic cylinder generates a force F' in the contact element that is greater than F.

In another preferred embodiment of the method of the invention, said method comprises, before step c), step:

k) Applying reinforcement means in the element of the marine structure to which the coupling structure is coupled, such that the marine structure is able to withstand the forces that the auxiliary floating system can introduce in the marine structure, through the contact elements.

The system is therefore applicable not only for marine structures previously designed for the use of said system, but also in structures which are not previously designed for the use of said system and are suitably reinforced to withstand the forces that the coupling structure of the auxiliary floating system can transmit.

In another preferred embodiment, the marine structure is a monopile structure and the reinforcement means comprise a complete or partial filling of the interior of said monopile with concrete. This filling is preferably performed in the support areas of the contact elements with the marine structure, and it can be a complete or annular filling of the interior of the monopile, at two levels coinciding with the two levels of contact elements of the coupling structure. In the case of monopiles equipped with transition parts between the monopile and the wind turbine tower, said reinforcement means can be applied in a similar manner on the transition part. This type of reinforcement has the advantage of being very easy to implement in already existing structures, by means of simply pouring concrete through the access door to the tower or another suitable passage into the monopile or transition part, generating in a simple and cost-effective manner a very robust reinforcement in the area provided for the coupling of the auxiliary floating system. In other embodiments, other reinforcement means, which can be metallic or of another type, known in the art can be used without departing from the scope of the invention as a result.

In another preferred embodiment of the method of the invention, the auxiliary floating system comprises: means for controlling and/or monitoring the tightening force and/or the position of the tightening elements; and/or means for opening and closing the closure ring. The means for opening and closing the ring can comprise, for example, hydraulic actuators having one end secured to the central part of the ring and the other end secured to a lateral part of the ring, such that when extended, they push the lateral part in order to close the ring progressively, and when drawn in, generate the opposite effect in order to open the ring.

In another preferred embodiment of the method of the invention, the auxiliary floating system comprises a combination of active tightening elements and passive elements. In the scope of the invention, passive elements are understood to be contact elements devoid of tightening means, but they exert force on the marine structure in a passive manner as a reaction. The use of active elements is essential for being able to regulate the tightening forces of the coupling structure, but the combination with some passive elements can reduce the number of active elements needed and, as a result, the cost of the system.

In another preferred embodiment of the method of the invention, the contact elements comprise support plates contacting the marine structure and the friction coefficient of which is greater than 3% such that upon tightening the contact elements against the marine structure, friction forces which contribute to generating a solid coupling between the marine structure and the auxiliary floating system are generated. In particular, when the closure ring surrounds the shaft of the marine structure or other vertical element of the marine structure, said friction will be advantageous for transmitting vertical forces and allowing the solid connection during heave. Therefore, during step e) of the method in which the crane is operating, by means of the tightening elements a high force is applied between the contact elements and the marine structure, thereby generating friction force that is sufficient for preventing relative vertical movements. In contrast, when the crane is not operating, said force can be reduced or relaxed, thereby reducing the friction force and enabling relative vertical movements, so as to adapt to the tides (this only applies to secured marine structures; it is not necessary in floating marine structures since the tide equally affects the marine structure and the auxiliary floating system).

In another preferred embodiment of the method of the invention, the closure ring of the auxiliary floating system comprises guards the position of which is such that, during steps b) and or c), the guards contact the marine structure before the contact elements do. In this context, said guards are understood to be flexible elements intended, for example, for damping impacts between two vessels or between a vessel and a secured element.

In another preferred embodiment of the method of the invention, the crane is a mobile land crane with caterpillars or wheels which is supported on at least one floating element. Being able to use land cranes instead of the marine cranes that are generally used for the maintenance of marine wind turbines represents a significant cost economy.

In another preferred embodiment of the method of the invention, the crane is a mobile land crane comprising: an upper body comprising at least one boom, counterweights, and the equipment for actuating the crane; a lower body comprising means for moving the crane by means of wheels and/or caterpillars; and wherein the auxiliary floating system only comprises said upper body of the crane. The weight of the crane is thereby reduced. Furthermore, dispensing with the lower body can be done given that during the method of the invention, the crane does not need to move. In this embodiment, the auxiliary floating system must comprise anchoring means for the connection of said upper body of the crane.

DESCRIPTION OF THE DRAWINGS

The foregoing and other features and advantages will be better understood from the detailed description of the invention, as well as from the preferred embodiments in reference to the attached drawings, in which:

FIGS. 3a-3b depict different views of the closure ring of the system of the invention, in a preferred embodiment thereof, in the open position (FIG. 3a) and the closed position (FIG. 3b).

LIST OF REFERENCE NUMBERS IN THE FIGURES

| | |
|---|---|
| (1) | Auxiliary floating system |
| (2) | Marine structure |
| (3) | Foundation |
| (4) | Shaft |
| (5) | Floating elements |
| (6) | Connection elements |
| (7) | Coupling structure |
| (8) | Closure ring of the coupling structure |
| (9) | Tightening elements |
| (9') | Contact elements |
| (10) | Lever |
| (11) | Hydraulic cylinders |
| (12) | Operation crane |
| (13) | Work area |
| (14) | Articulation point |
| (15) | Reinforcement means |
| (20) | Wind turbine |

DETAILED DESCRIPTION OF THE INVENTION

A detailed description of the invention in reference to different preferred embodiments thereof, based on FIGS. 1-10 herein, is set forth below. Said description is provided in order to illustrate, but not limit, the claimed invention.

Figure 1:
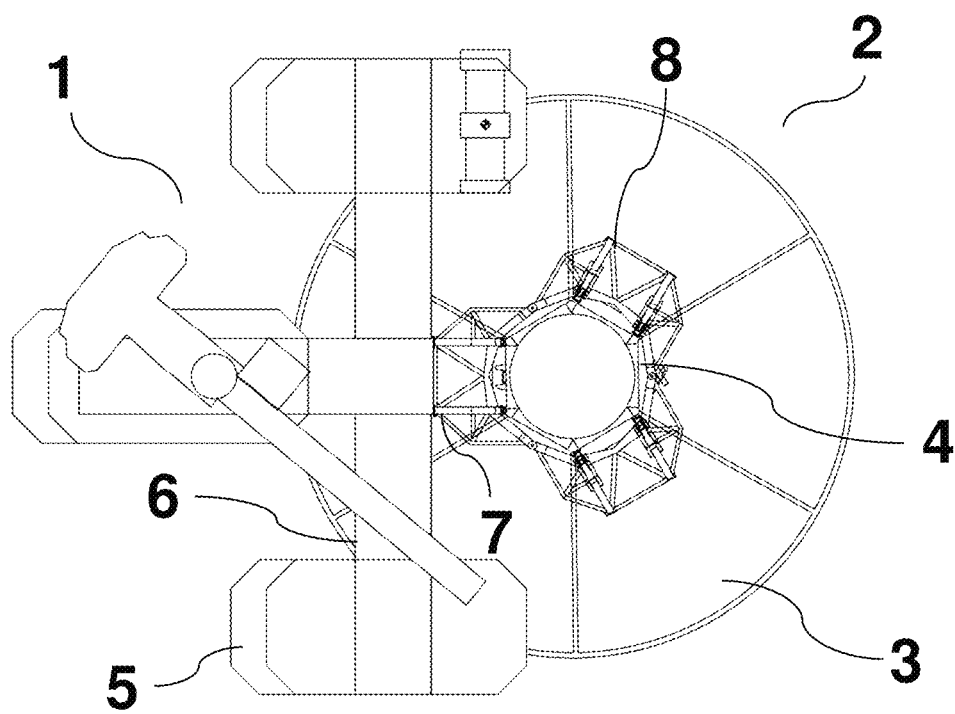
FIG. 1 illustrates a top view of the auxiliary floating system together with a marine structure.

FIG. 1 illustrates a top (plan) view of the auxiliary floating system (1) of the invention, together with a marine structure (2) which supports a wind turbine (20), wherein said marine structure (2) comprises a foundation (3) and a tower or shaft (4). In this embodiment, the auxiliary floating system (1) comprises at least one floating element (5) (namely, in the example of FIG. 1, three of said elements (5) are shown). The auxiliary floating system (1) is coupled to the marine structure (2) preferably during operations for the maintenance thereof (although in certain specific embodiments of the invention, the use thereof in other methods, such as the installation or transport of the marine structure (1) to its definitive offshore position, would also be possible).

The floating elements (5) of the system (1) are connected, by means of connection elements (6) (for example, trusses or lattice jibs), to a coupling structure (7) which is preferably intended for surrounding at least one element of the marine structure (2), being arranged for example around the shaft (4), such that the points or regions of contact with the coupling structure (7) provide a means for solid securing to the marine structure (2), such that the floating system (1) maintains its position during the mentioned operations. Preferably, the coupling structure (7) forms a closure ring (8) around the shaft (4), which can be circular or have any other closed geometry, being curved or polygonal, for example.

In relation to the points or regions of contact between the coupling structure (7) and the marine structure (2), the system of the invention is equipped with one or more tightening elements (9), which contact and tightening elements are secured to the coupling structure (7) and can preferably be arranged along the closure ring (8). Said tightening elements (9) preferably comprise active actuators, such as hydraulic cylinders, for example, which allow, once the system (1) is coupled to the marine structure (2) by means of the coupling structure (7), a tightening force to be generated in the marine structure, and the position of said system (1) to be thereby solidly or quasi-solidly secured with the marine structure (2). The solid attachment between the coupling structure (7) and the marine structure (2) allows the relative movements between both structures to be eliminated or sufficiently limited. In this context, it should be understood that certain aspects such as the elastic deformation of materials can result in small relative movements, without falling outside of the scope of the invention as a result. In any case, the solid attachment between the coupling structure (7) and the marine structure (2) will always allow the relative translational movements to be limited to less than 50 cm, and the relative rotational movements to less than 2 degrees in roll or pitch and to less than 5 degrees in yaw.

In a bottom-fixed foundation (3), movements of the marine structure (2) are virtually nil, whereby referring to the coupling as being is solid or quasi-solid is interpreted as said movements being virtually nil both for the marine structure (2) and for the coupling structure (7). However, in a floating marine structure (2) this does not happen, as there are generally movements therein. In this case, the quasi-solid or solid coupling will be understood to be a virtually nil relative movement between the marine structure (2) and for the coupling structure (7).

The tightening elements (9) typically comprise active elements, such as arms that can be deployed by means of electromechanical, hydraulic, pneumatic, or similar systems, which allow the position of the contact elements (9') to be regulated and thereby approximated to the marine structure (2) until contacting same. The tightening elements (9) can thereby also comprise passive elements, configured for example as stops which limit or impede the movement of the marine structure (2) in relation to the floating system (1), keeping the position thereof relative to the closure ring (8) unchanged.

Optionally, the system (1) of the invention can also comprise contact elements (9') suitable for use during the steps prior to the complete securing of the tightening elements (9) on the marine structure (2). Said contact elements (9') may or may not be comprised in the tightening elements (9) themselves and are preferably suitable for providing a free sliding contact with the shaft (4). The contact elements (9') thereby allow the relative vertical movement between said shaft (4) and the auxiliary floating system (1) in the steps prior to the solid fitting of the tightening elements (9) on the marine structure (2). The coupling structure (7) thereby provides, by means of the contact elements (9'), a physical stop against variations in the position of horizontality of the marine structure (2), also limiting the possible inclinations said structure may sustain (for example, due to the wind, waves, etc.) and helping said structure (2) maintain its stability, but by means of preferably sliding contacts, which allow the free movement thereof along a substantially vertical axis. The mentioned free movement of the marine structure (2) can be carried out by sliding, by rolling, with caterpillars, or any known technique which allows an independent and sufficient free relative movement between the contact elements (9') across the surface of the shaft (4).

The contact elements (9') therefore impede and/or limit other relative movements between the auxiliary floating system (1) and the shaft (4), whether it is a relative horizontal movement (preferably equal to or less than 1 m), relative rotation during roll and/or pitch (preferably equal to or less than 10 degrees), and relative rotation during yaw (preferably less than 20 degrees). However, and in a novel manner in the present invention, the tightening elements (9) are in charge of impeding or limiting the relative vertical movement between the marine structure (2) and the floating system (1) during maintenance operations.

Figures 2A, 2B:
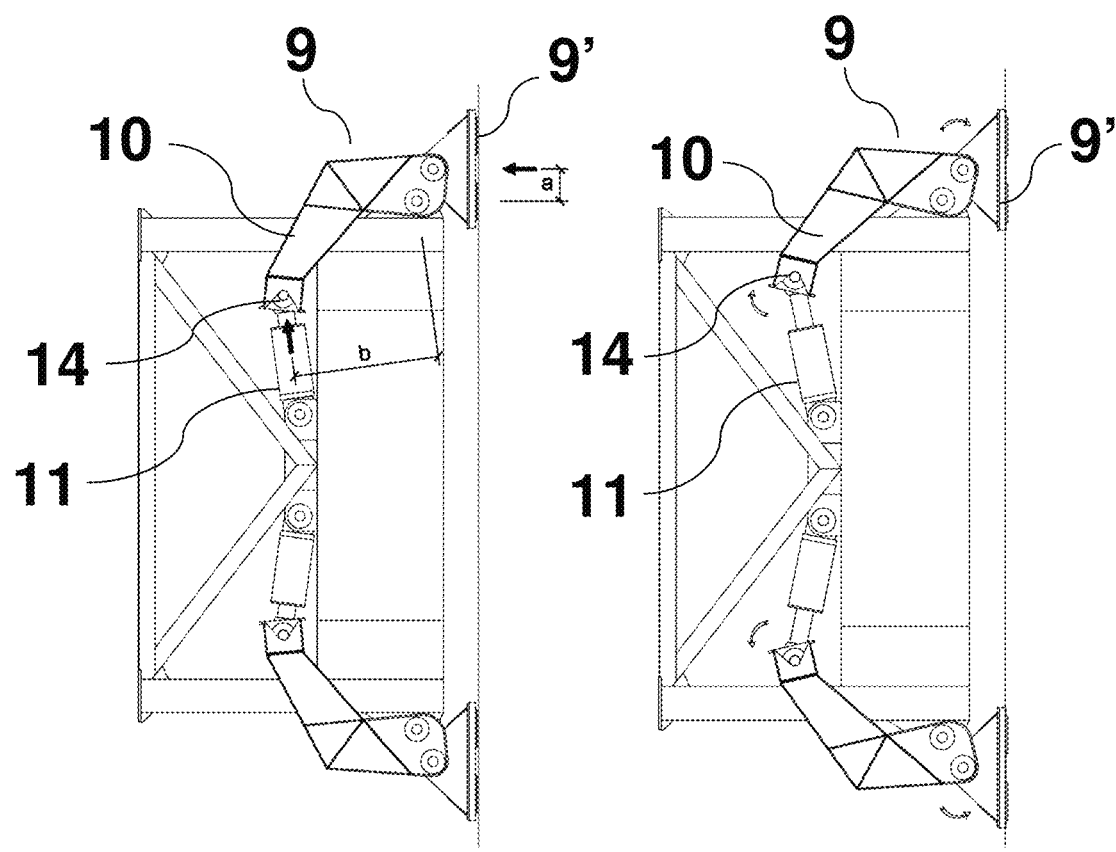
FIGS. 2a-2b show two detailed views of the tightening elements of the auxiliary floating system of the invention, wherein in one of the views (2a) said elements are not yet secured to the marine structure, and in the other view (2b) they are secured thereto, the floating system being solidly secured to the marine structure.

Likewise, in an embodiment of the invention in which the marine structure (2) has a boat landing, the geometry of the closure ring (8) allows interferences with said boat landing to be prevented. Said geometry, therefore, could be adapted to the shape characteristics of the marine structure (2) in order to facilitate securing the system (1) thereto, and therefore improving the maintenance operations. FIGS. 2a-2b show a possible embodiment of the tightening elements (9), wherein said elements comprise at least a contact element (9') coupled to a lever (10), which can be actuated by means of a hydraulic cylinder (11). In this embodiment, once the coupling structure (7) is closed on the shaft (4), the levers (10) are actuated until contacting said shaft (4), maintaining the mentioned actuation and, therefore, the deployment of the levers (10) until the floating system (1) is solidly coupled to the marine structure (2). In this example, all the tightening elements (9) could adopt an active configuration (in the form of levers (10) exerting opposing forces through the hydraulic cylinders (11)), or a combination of levers (10) and passive elements could be used, wherein said levers (10) would exert a force, through the shaft (4), against the passive elements. The actuation of the levers (10) can be performed in situ or through remote control means, in different embodiments of the invention. Likewise, the connection between the levers (10) and the hydraulic cylinders (11) can be articulated by means of one or more articulation points (14).

In a possible embodiment of the invention, at least three contact elements (9') are used at a first height in the coupling structure (7), and at least three contact elements (9') are used at a second height in the coupling structure (7). The closure ring (8) is thereby configured with two support levels, which improves the capacity of absorbing moments produced by the relative inclination between the marine structure (2) and the auxiliary floating system (1). Likewise, said ring (8) can have different mechanisms for closing or for holding its position around the marine structure (2), whether through pins, cooperating attachments, electromechanical systems, or any other known means.

In the example of FIGS. 3a-3b, the coupling structure (7) is formed by a metallic lattice structure. Furthermore, said coupling structure (7) comprises an opening and/or closing subsystem (not shown in the figures) to facilitate the placement and/or removal thereof relative to the marine structure (2), and optionally one or more actuators for the folding and/or deployment of the system (1) on the marine structure (2)). Said actuators may or may not be remotely actuated, and in different embodiments, they can comprise hydraulic telescopic cylinders that are able to exert force when elongated and shortened. Alternatively, they can also comprise different types of means known in the art, such as mechanical, pneumatic, or hydraulic actuators, hauling ropes actuated by means of ropes, winches, or the like. The means for opening and closing the ring (8) can consist, for example, of hydraulic actuators having one end secured to the central part of said ring (8) and the other end secured to a lateral part thereof such that, when extended, they push the lateral part in order to close the ring (8), and when drawn in, they generate the opposite effect in order to open the ring.

FIG. 3a shows a top or plan view of the closure ring (8) in the open configuration. The closure ring has a central sector and two lateral sectors, connected at respective articulation points to the central sector. By rotating the lateral sectors at said articulation points, the ring in the closed configuration can be arranged, as shown in FIG. 3b.

As mentioned, the coupling structure (7) is preferably modular or adjustable so that it can be adapted to marine structures (2) and/or shafts (4) of different dimensions and/or characteristics, without needing to previously modify said structures (2) or provide them with additional means or substructures. For example, a module can be added to or removed from the lattice jibs of the coupling structure (7) in order to adjust the length thereof, and, therefore, its distance to the shaft (4), thereby preventing the shaft (4) itself from having to be altered. In an alternative or complementary manner, the position and/or dimension of the tightening elements (9) and/or of the contact elements (9') can be changed or regulated, such that the same auxiliary floating system (1) can be used for the maintenance of marine structures (2) with shafts (4) of a different diameter, or with shafts (4) of a variable diameter or of a different section (e.g. hexagonal or circular) and of different dimensions (for example, a different apothem or diameter).

Figure 4:
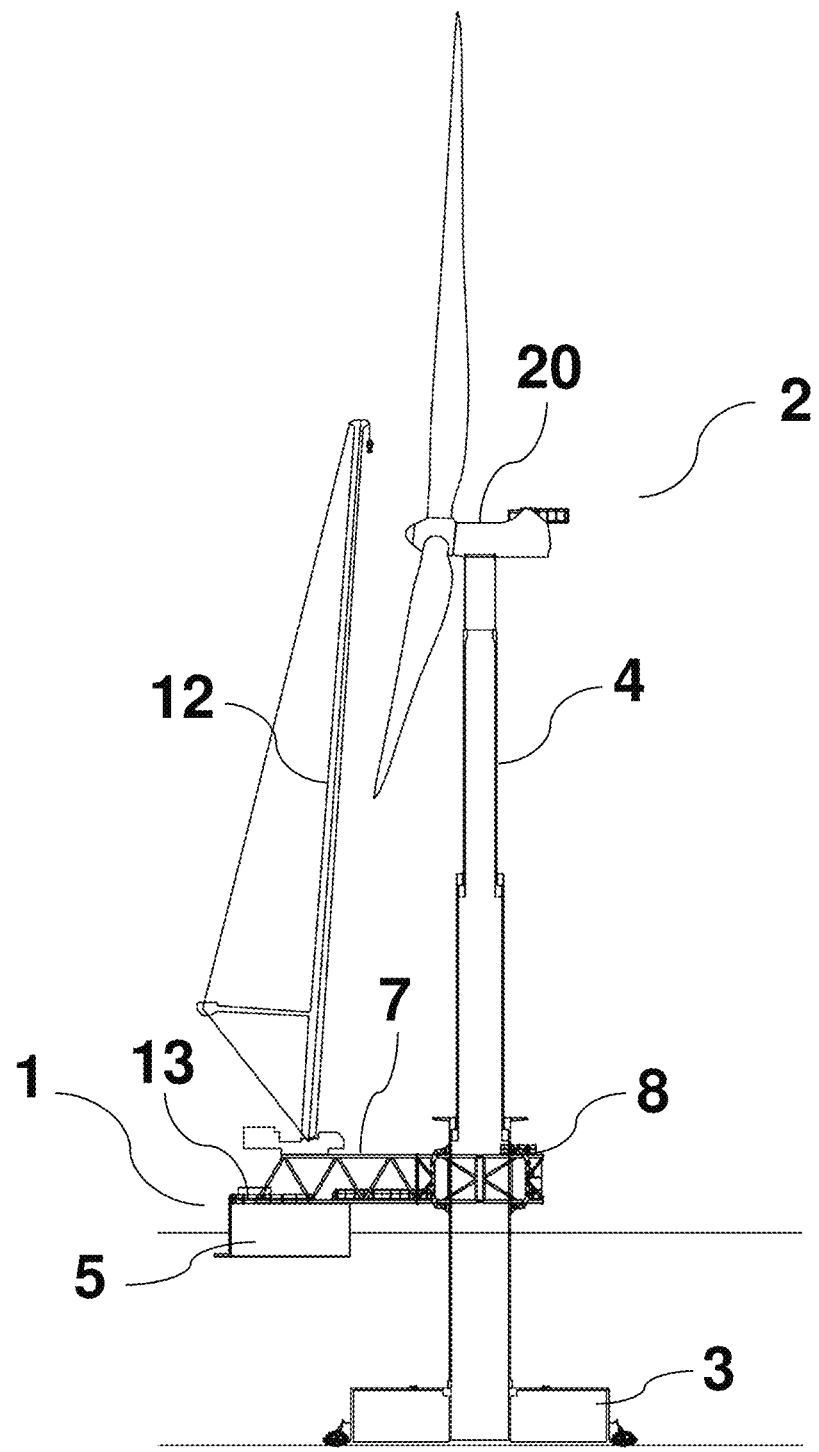
FIG. 4 depicts a first preferred embodiment of the system of the invention, applied to the maintenance of a telescopic wind turbine tower.

As can be seen in FIG. 1 and in the profile view of FIG. 4, in a preferred embodiment of the system (1) of the invention, said system comprises a maintenance operation crane (12), preferably arranged in a work area (13) of said system, the location of which can be in the floating elements (5) themselves, or in accessory structures installed for that purpose. The work area (13) will likewise and preferably be used for the storage and/or repair of components of the marine structure (2) (for example, components of a turbine or of the blades of a wind turbine (20)). In different embodiments of the invention, said work area (13) can be an elevated area and/or free area with respect to the floating elements (5).

Preferably, land cranes (12) (understood to be mobile commercial cranes or cranes on caterpillars, commonly used in construction works on land) that are more cost-effective than marine cranes could be used, which is possible as a result of the fact that the solid coupling of the floating system (1) to the marine structure (2) limits the movements of the system and facilitates the operations of the crane during maintenance operations, even for working at great heights, as occurs for example in operations for the maintenance of wind turbines (20). The crane (12) can be, in different embodiments, a folding and/or telescopic crane, and it will preferably remain folded in the steps prior to the solid coupling (FIG. 5) between the floating system (1) and the marine structure (2). Once said coupling has been performed, the mentioned crane can be deployed in a safe manner, and maintenance tasks at a height can thereby be performed in a safe manner.

Figure 5:
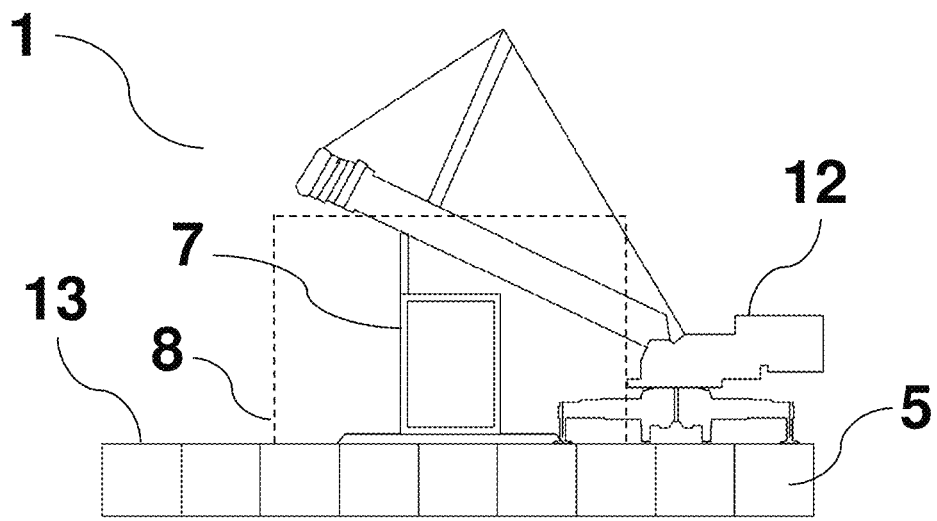
FIGS. 5-7 illustrate different views of a second preferred embodiment of the system of the invention, wherein the floating elements thereof are configured in the form of a barge.
Figure 6:
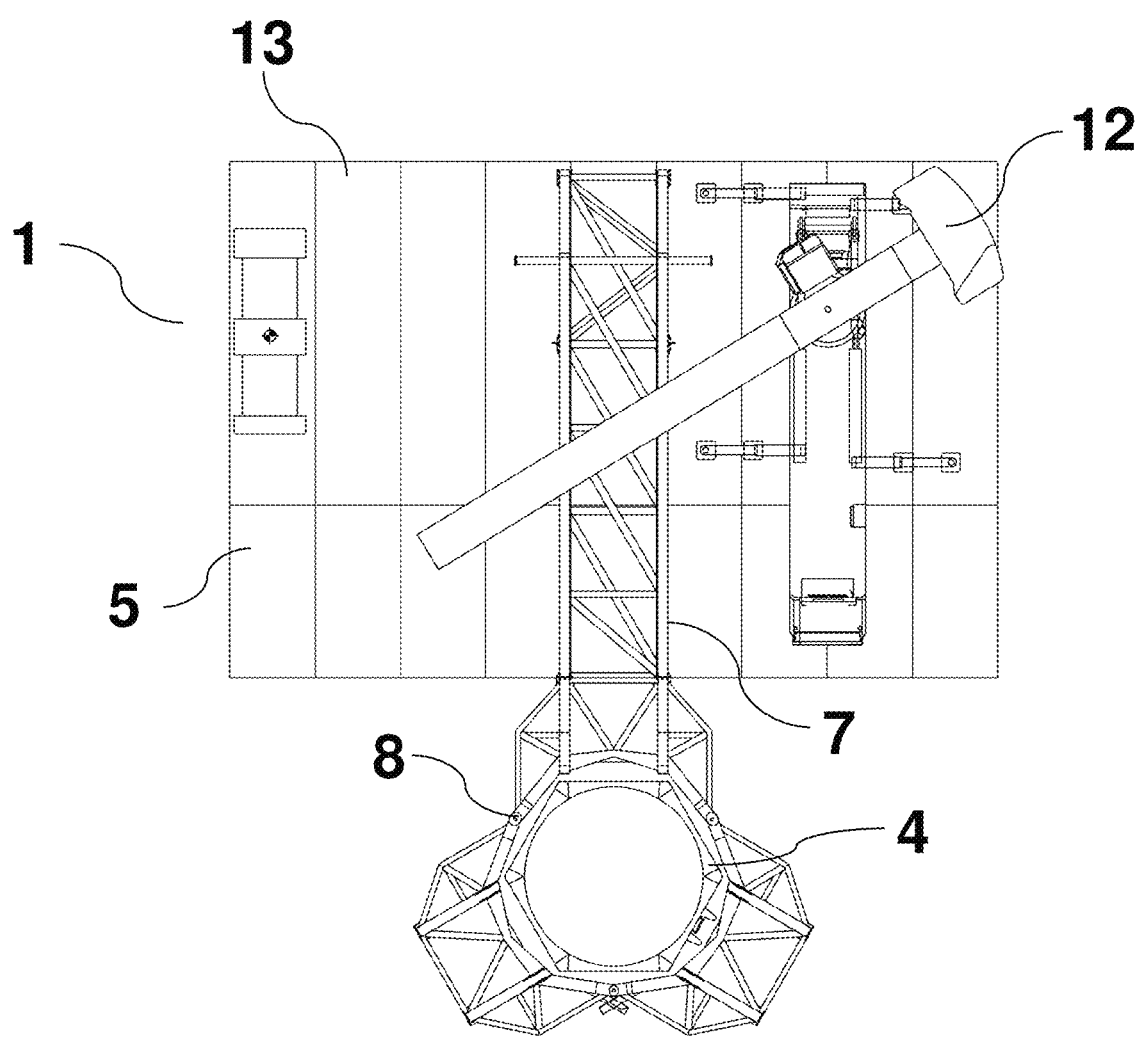
Figure 7:
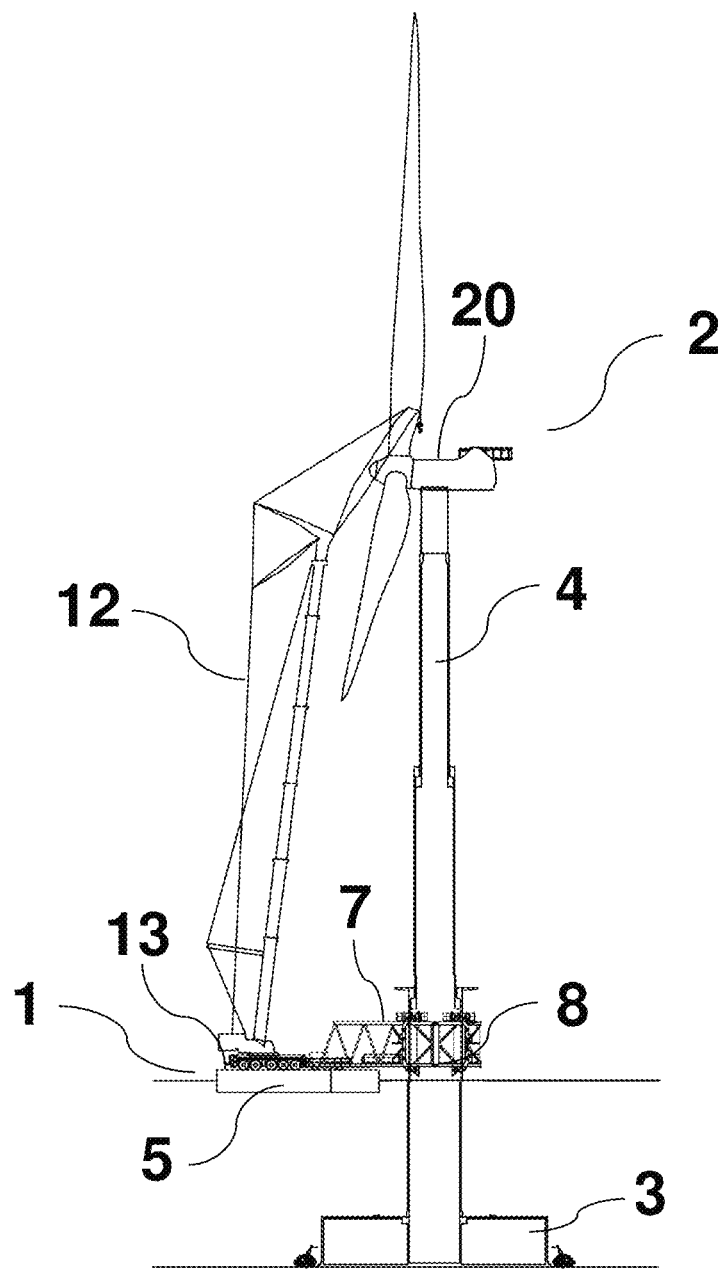

FIGS. 5-7 show a second preferred embodiment of the invention, wherein the floating elements (5) of the auxiliary floating system (1) integrate a single support block in the form of a barge, wherein both the crane (12) and the work area (13) are arranged. FIGS. 5 and 6 show an elevational and a plan view of the situation in which the crane (12) has a telescopic boom which is folded. This situation is preferable for the phases in which the auxiliary floating system (1) floats independently and uncoupled from the marine structure (2) (for example in step a)). During these phases, the boom and hook of the crane (12) can have provisional elements for being secured to secured elements of the auxiliary floating system (1) in order to mitigate possible effects of the movements of said system (1) when afloat.

Likewise, in different embodiments of the invention, the floating elements (5) can comprise hydrodynamic damping plates, for example heave plates, in order to reduce and dampen undesired movements caused by the waves. Likewise, the mentioned floating elements (5) of the system (1) can be ballasted in order to provide an additional means for controlling the buoyancy thereof and, as a result, the stability of the marine structure (2) as well. The floating elements (5) can thereby comprise one or more ballasting regulation means located in the underwater body thereof (that is, the part of the floating body that is submerged, in contact with the water) in order to allow and/or control water flow between the inside of said floating element (5) and the mass of water in which it floats. This allows the behavior thereof to be adjusted, modifying the damping and natural frequency of the assembly in the phase of transporting to the marine structure (2). And during maintenance operations, it limits the effect of the tides on the floating system (1) and marine structure (2) assembly. This capacity is particularly advantageous in those operations in which the system (1) holds heavy equipment (for example, a blade of wind turbine (20) that is to be replaced) in an eccentric manner, which would alter the horizontality thereof. As a result of the eccentric ballasting of the floating elements (5), the system can offset the destabilizing effect of said equipment during maintenance operations, and even in the prior steps of transporting the system (1) to the offshore site of the marine structure (2). Likewise, the ballasting means can be used as a tide offset means, allowing water to be introduced in or evacuated from the floating elements (5). This ballast can be used to offset the action of the tides while the system (1) is coupled to the marine structure (2), for example, in the maintenance of secured wind turbines (20).

The ballasting regulation means preferably comprise gates with an opening that can be regulated and/or remotely actuated, and/or pumps for removing or introducing water. The opening of the regulation gates allows the fill level and/or water inlet/outlet level of the floating elements (5) of the system to be established, which in practice is the equivalent to regulating the effective waterplane area and/or draft. It is thereby also possible to indirectly control what the oscillation period of said floating elements (5) and/or of the assembly they form with the marine structure (2) will be in the different steps of the operations for the transport or maintenance of the marine structure (2).

In turn, the floating elements (5) can be manufactured using different materials known in the art, preferably concrete and/or metallic materials. Mixed constructions can also be used, manufacturing a lower part in concrete and the rest of the floating element (5) in steel. Prefabricated concrete techniques similar to those commonly used for the construction of prefabricated tanks can also be used.

The configuration of the floating elements (5) can also be modular in order to adjust their overall size. The parts or modules which can be used to form said floating elements (5) can adopt various shapes, the dimensions therefore being preferably such that they can be placed in a container (not exceeding the dimensions of a standard container) to facilitate the transport and reuse thereof. Said modules can be attached to one another to form a floating element (5) both at the base and in height.

Preferably, the assembly formed by the floating element (s) (5) and the coupling structure (7) for coupling to the marine structure (2) is hydrodynamically self-supporting, such that the distribution of masses of said floating elements (5) and of the coupling structure (7), and the corresponding center of flotation thereof, is such that the floating elements (5) are balanced in the upright position when the opening and/or closing subsystem (10) is open (that is, with the system (1) uncoupled from the marine structure (2)).

In another preferred embodiment of the invention, the method for maintenance can comprise an additional step wherein reinforcement means (15) are applied in the element of the marine structure (2) to which the coupling structure (7) is coupled, such that the marine structure (2) is able to withstand the forces that the auxiliary floating system (1) can introduce in the marine structure, through the contact elements (9').

Figure 8:
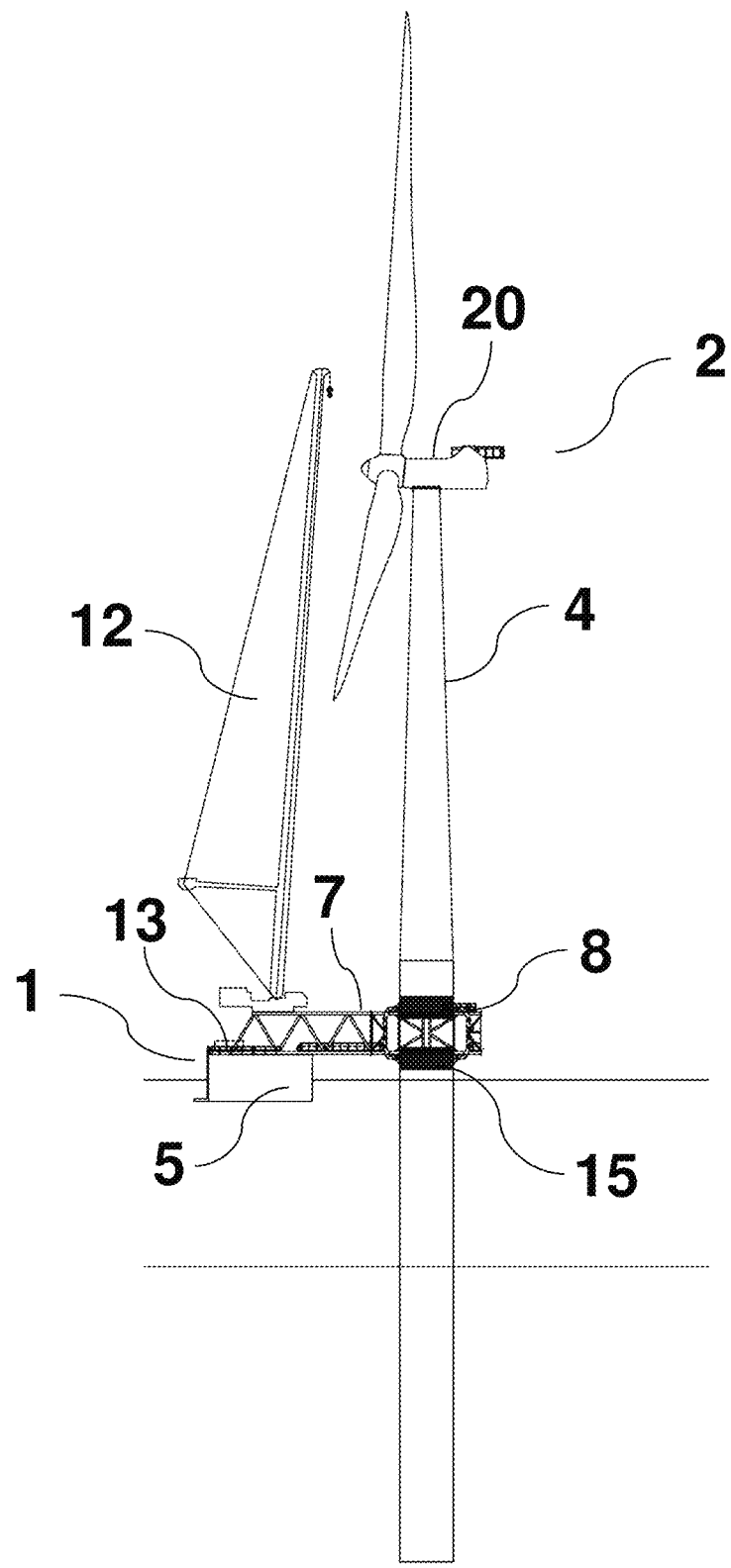
FIG. 8 shows a third preferred embodiment of the invention, wherein the marine structure is a monopile structure and preferably comprises reinforcement means in a complete or partial filling of the interior of said monopile.

FIG. 8 shows a monopile marine structure (2), and the reinforcement means (15) therein preferably consist of a complete or partial filling of the interior of said monopile with concrete. This filling is preferably performed in the areas of contact of the contact elements (9'), and can be a complete, partial, or annular filling of the interior of the monopile, at two levels coinciding with the two levels of contact elements (9') of the coupling structure (7). In the case of monopiles equipped with transition parts between the monopile and the marine structure (2), said reinforcement means can be applied in a similar manner on the transition part. In other embodiments, other reinforcement means, which can be metallic or of another type, known in the art can be used without departing from the scope of the invention as a result.

In another preferred embodiment of the invention, the crane (12) is a mobile land crane equipped with at least one boom, counterweights, and the equipment for actuating the crane, a lower body comprising means for moving the crane by means of wheels and/or caterpillars; and wherein the auxiliary floating system (1) only comprises said upper body of the crane (12) (the weight thereof is thereby reduced). Furthermore, dispensing with lower body can be done given that during the method for maintenance, the crane (12) does not need to move. In this embodiment, the auxiliary floating system (1) must comprise anchoring means for the connection of said upper body of the crane (12). An example of said embodiment is shown in FIG. 4, wherein it can be seen that only the upper body of the crane is used, in contrast with, for example FIGS. 5-7, in which a land crane with both bodies (including the lower body with wheels) is used.

Figure 9:
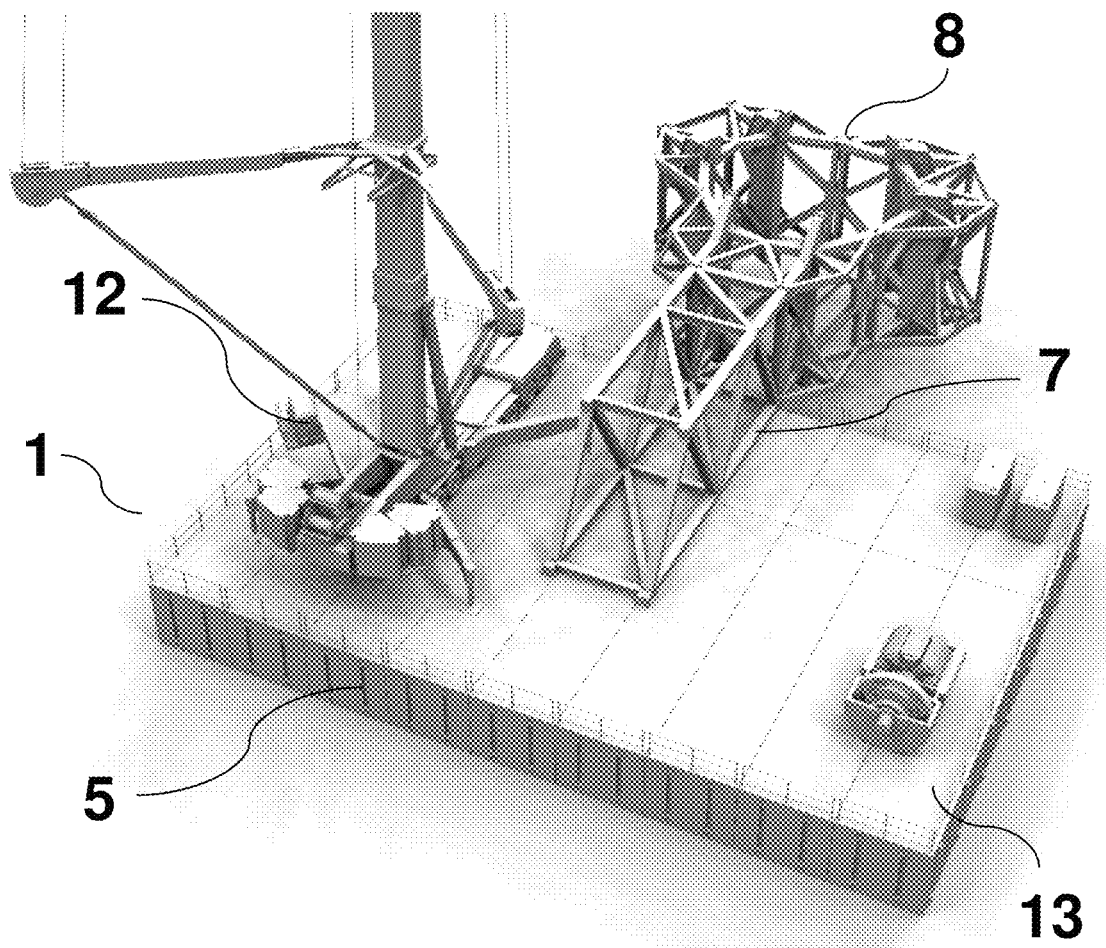
FIGS. 9-10 illustrate different views of the second preferred embodiment of the system of the invention corresponding to FIGS. 5-7, wherein the floating elements of said system are configured in the form of a barge.
Figure 10:
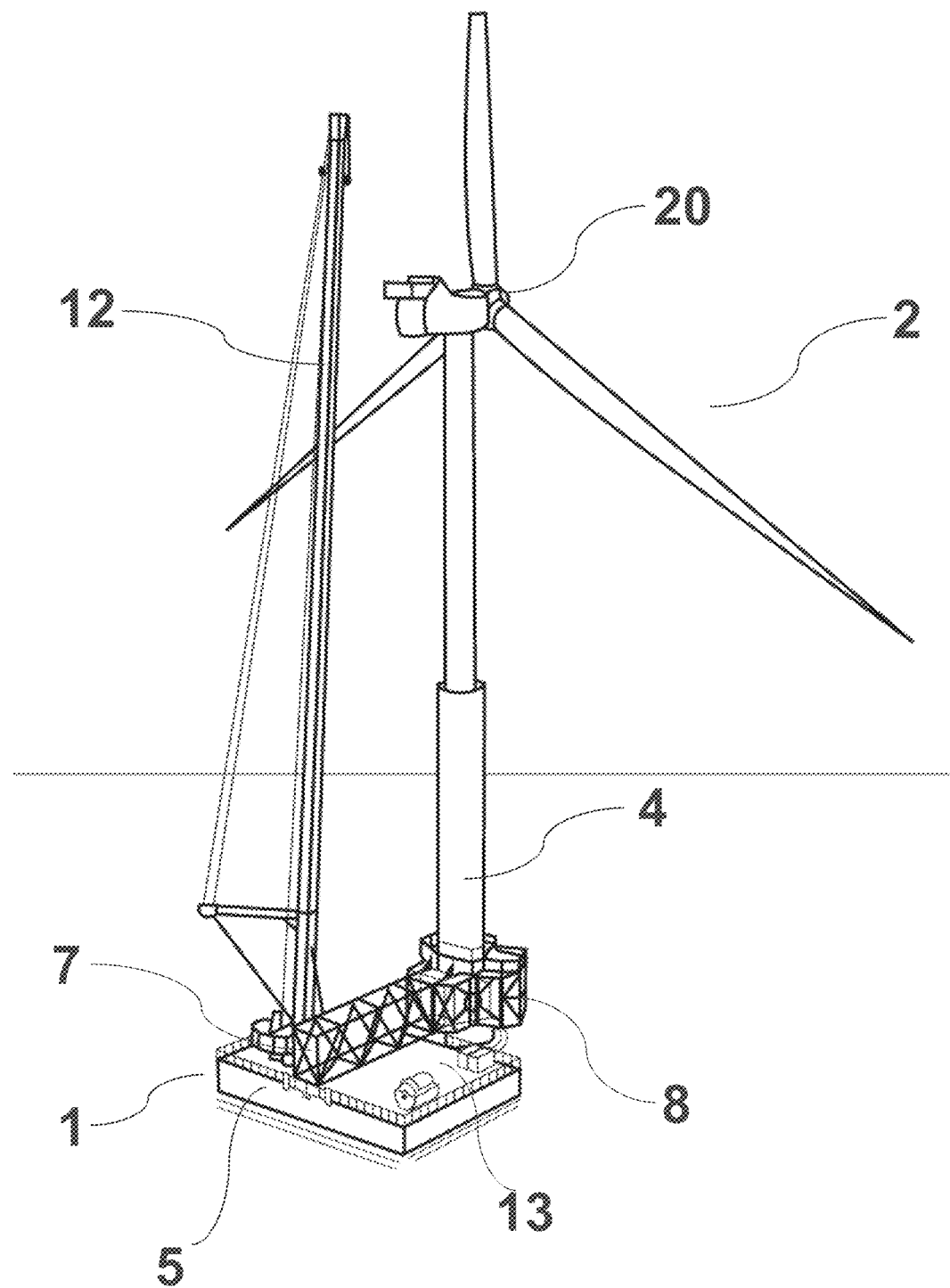

Lastly, by way of illustration, FIGS. 9-10 show different views of the preferred embodiment of the auxiliary floating system (1) of the invention corresponding to FIGS. 5-7, wherein the floating elements (5) are configured in the form of a barge.

The invention claimed is:

1. A method for the maintenance of a wind turbine supported on a marine structure, which can be floating or secured on the seabed, and comprising a shaft and/or a foundation, the method comprising use of an auxiliary floating system comprising:
   one or more floating elements;
   at least one crane located on at least one of said floating elements;
   at least one work area for the storage and/or repair of components of the wind turbine and/or the marine structure; and
   at least one coupling structure for coupling to the marine structure, wherein said coupling structure comprises:
      an articulated closure ring suitable for being closed surrounding an element of the marine structure;
      a plurality of contact elements between the coupling structure and the marine structure; and
      one or more tightening elements which allow the position of the contact elements to be regulated, said tightening elements being suitable for exerting a tightening force in a substantially horizontal direction, through the contact elements, on the marine structure, and wherein the coupling structure can adopt at least three configurations:
   an open configuration, in which the closure ring is open;
   a closed configuration, in which the closure ring is closed; and
   a tightened configuration, in which the closure ring is closed, and the tightening elements are arranged exerting a tightening force on the marine structure;
   and said method further comprising performing the following steps, in any order that is technically possible:
   a) transporting the auxiliary floating system afloat to the location of the marine structure;
   b) approximating the auxiliary floating system to the marine structure, with the coupling structure in the open configuration;
   c) arranging the coupling structure in the closed configuration, such that the closure ring completely surrounds an element of the marine structure;
   d) acting in a controlled manner on the tightening elements, so as to arrange the coupling structure in the tightened configuration, such that the marine structure and the auxiliary floating system come to be solidly connected in six degrees of freedom of movement, said degrees of freedom comprising heave, surge, sway, yaw, pitch, and roll;
   e) using the crane to perform maintenance tasks on the wind turbine and/or on the marine structure;
   f) using the work area of the auxiliary floating system for storing and/or repairing components of the wind turbine and/or of the marine structure; and
   g) uncoupling the auxiliary floating system from the marine structure, and arranging the coupling structure in the open configuration.

2. The method according to claim 1, wherein the auxiliary floating system comprises a plurality of floating elements connected to one another and/or to the coupling structure.

3. The method according to claim 1, wherein the auxiliary floating system comprises a single floating element in the form of a barge, and in which both the crane and the work area are arranged, and wherein said barge is formed by a single body or by the attachment of several modules that are connected to one another.

4. The method according to claim 1, wherein the crane is a telescopic and/or folding crane, and wherein said crane is deployed after step d) and folded up again before step g).

5. The method according to claim 1, wherein the work area is located at least in part at a distance from the crane that is greater than the minimum radius of action of said crane.

6. The method according to claim 1, wherein the work area is at least in part free with respect to the floating elements, such that at least part of the area of the work area is not located on the deck of a floating element.

7. The method according to claim 1, wherein step a) and/or step b) are performed by towing the auxiliary floating system, or by self-propelled transport of said system.

8. The method according to claim 1, wherein the floating elements comprise hydrodynamic damping plates.

9. The method according to claim 1, wherein the floating elements are ballasted in a central or eccentric manner.

10. The method according to claim 1 further comprising, after step d),
   j) ballasting at least one floating element to offset a rise in tide and/or unballasting at least one floating element to offset a lowering of the tide.

11. The method according to claim 1, wherein the freeboard of the auxiliary floating system is compatible with the tidal range, such that, while the auxiliary floating system remains coupled to a secured marine structure, the variation of the tide never reduces the freeboard to less than 10 cm.

12. The method according to claim 1, wherein the auxiliary floating system is equipped with one or more approximation or securing cables between said system and the marine structure, and wherein the length of said cables is regulated during step b) of approximation.

13. The method according to claim 1, wherein the closure ring holds an inner space sufficient for the coupling thereof to a region of the marine structure comprising a boat landing structure.

14. The method according to claim 1, wherein the tightening elements comprise:
   a lever secured at an articulation point with respect to which it can rotate;
   a contact element connected to a point of said lever; and
   an extendable and/or folding hydraulic cylinder connected to another point of said lever,
   and wherein by actuating the hydraulic cylinder to extend and/or fold it, said lever is caused to rotate, and the position and/or force exerted by said contact element is thereby regulated.

15. The method according to claim 14, wherein the distance between the line of action of the hydraulic cylinder and the articulation point is greater than the distance between the line of action of the contact element and the articulation point, such that by the lever effect, a force F in the hydraulic cylinder generates a force F' in the contact element that is greater than F.

16. The method according to claim 1, further comprising, before step c),
   k) applying reinforcement means in the element of the marine structure to which the coupling structure is coupled, such that the marine structure is able to withstand the forces that the auxiliary floating system can introduce in the marine structure, through the contact elements.

17. The method of claim 16, wherein the marine structure is a monopile structure and the reinforcement means comprise a complete or partial filling of the interior of the monopile with concrete.

18. The method according to claim 1, wherein the auxiliary floating system comprises:
- means for controlling and/or monitoring the tightening force and/or the position of the tightening elements; and/or
- means for opening and closing the closure ring.

19. The method according to claim 1, wherein the auxiliary floating system comprises a combination of active tightening elements and passive elements.

20. The method according to claim 1, wherein the contact elements comprise support plates contacting the marine structure and the friction coefficient of which is greater than 3%, such that upon tightening the contact elements against the marine structure, friction forces which contribute to generating a solid coupling between the marine structure and the auxiliary floating system are generated.

21. The method according to claim 1, wherein the closure ring comprises guards positioned such that, during steps b) and or c), the guards contact the marine structure before the contact elements do.

22. The method according to claim 1, wherein the crane is a mobile land crane with caterpillars or wheels, which is supported on at least one floating element.

23. The method according to claim 1, wherein the crane is a mobile land crane comprising:
- an upper body comprising at least one boom, counterweights, and the equipment for actuating the crane; and
- a lower body comprising means for moving the crane by means of wheels and/or caterpillars, and wherein the auxiliary floating system only comprises said upper body of the crane.

* * * * *